United States Patent [19]
Conner

[11] 3,791,040
[45] Feb. 12, 1974

[54] RECESS TEMPLATE
[75] Inventor: James Marvin Conner, Chattanooga, Tenn.
[73] Assignee: Combustion Engineering Inc., Windsor, Conn.
[22] Filed: Apr. 7, 1972
[21] Appl. No.: 243,524

[52] U.S. Cl. ............................. 33/174 G, 33/174 R
[51] Int. Cl. ............................................. G01b 5/20
[58] Field of Search .......... 33/174 R, 174 G, 174 N, 33/174 P, 174 PA, 30 R, 30 C, 30 F, 149 R, 149 B, 151, 169 B

[56] References Cited
UNITED STATES PATENTS
| 11,005 | 6/1854 | Taylor | 33/174 G |
| 1,358,794 | 11/1920 | Stewart | 33/174 G |

Primary Examiner—John W. Huckert
Assistant Examiner—Jon W. Henry
Attorney, Agent, or Firm—Frederick A. Goettel, Jr.

[57] ABSTRACT

A manually manipulatable template is disclosed having particular utility in giving an indication of the amount of material which must be removed to accurately machine a uniform depth, uniform diameter recess in a spherical surface. A parallel linkage having members bearing the desired recess profile is pivotally attached to a mounting plate one edge of which has a radius of curvature conforming to that of the spherical surface. The parallel linkage is particularly unique in that a constant distance is maintained between the profile bearing members, as the linkage is rotated on the mounting plate.

2 Claims, 6 Drawing Figures

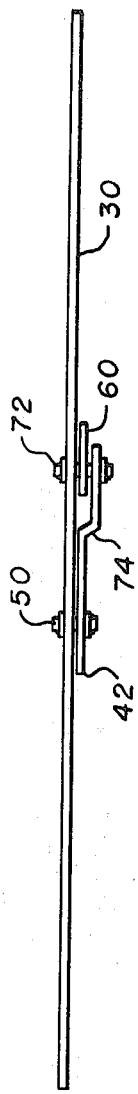
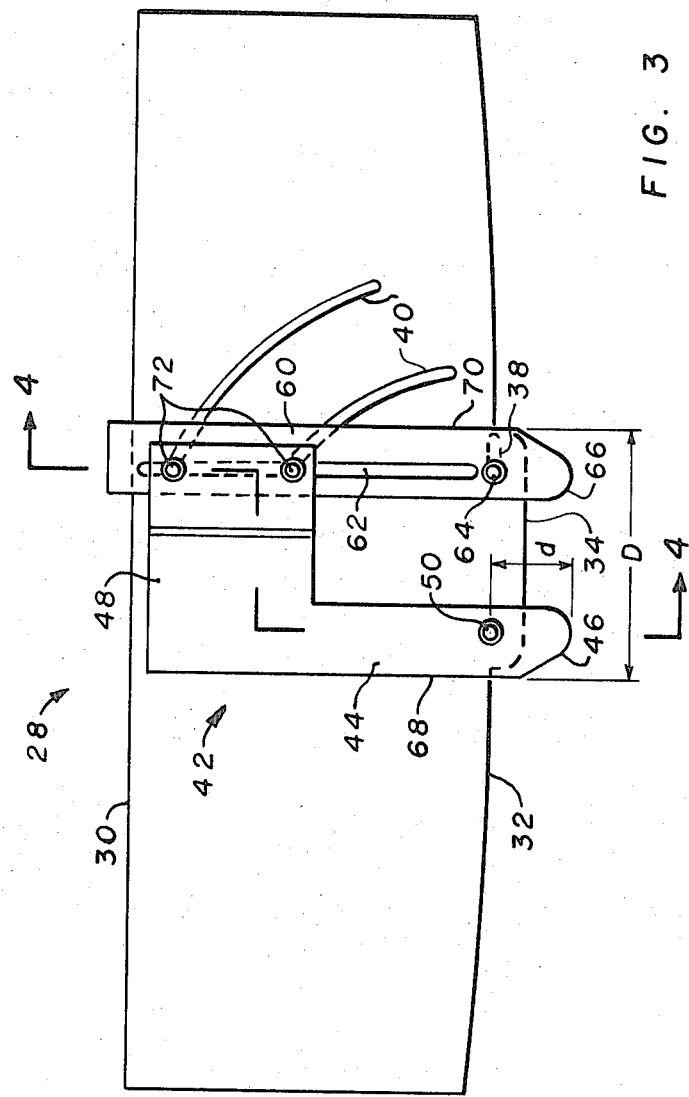
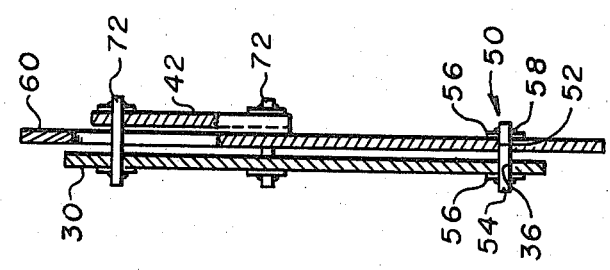

RECESS TEMPLATE

BACKGROUND OF THE INVENTION

1. Field of the Invention

This invention relates to adjustable templates and more particularly to a template for assisting in machining constant depth, constant diameter recesses in the surface of a spherically formed closure head.

2. Description of the Prior Art

The pressure vessel of a typical pressurized water nuclear reactor includes an elongated cylindrical section having a hemispherically formed bottom head formed integrally therewith. The upper closure head of the reactor vessel is also hemispherically formed and is removable for core installation and replacement. In order to effectively control and monitor the reactivity and power level of a nuclear reactor it is necessary that control elements and various instrumentation have access to the core region of the reactor. Such access can only be achieved through openings provided in the walls of the pressure vessel.

A common arrangement for achieving such access is to provide openings in the removable closure head for the control elements, while access to instrumentation is provided through openings in the lower spherical head. In order to maintain the high pressure integrity of the reactor vessel it is imperative that a sound, pressure tight seal be made around the elements extending through each of the head openings. One approach to achieving this result is to machine the desired opening to accept one end of a tubular nozzle the other end of which includes a flange to which the control element drive or instrumentation lead is in turn attached. These nozzles extend completely through the head opening and a circumferential seal weld is made to attach the nozzle end to the interior surface of the head. Due to the requirement of having a high quality weld at this point, stringent requirements have been promulgated regulating, among other variables, the size of such welds.

Specifically, it is particularly important that each of such welds be of a uniform depth and diameter. Such uniformity of dimensions is readily achieved by machining out a uniform counterbore or weld prep around each of the head openings to receive the weld material. The machining of such weld preps presents few problems when the axis of the opening around which it is made extends substantially perpendicular to the head surface. However, since the axis of each of the head penetrations is parallel to the longitudinal axis of the cylindrical reactor vessel, the interior surface countour of each weld prep depends upon where on the hemispherical surface it lies. The greater the distance the weld prep is from this axis the more difficult it is to accurately machine.

Past practice has been to first drill a pilot hole at the point where the penetration is to be made. A drop bow compass is then used to scribe the weld prep outline on the surface of the head. Viewing this outline, along the axis of the penetration, i.e., parallel to the reactor longtiudinal axis, it appears as a circle of a predetermined diameter. Viewing the outline along a line perpendicular to the surface at the point at which the penetration is to be made, however, it appears as an ellipse. Using this outline as a guide a cutting torch is used to roughly remove the metal from the weld prep area. Following this first rough cut it is necessary to determine how much additional material must be removed. A depth gauge is one means which has been used for determining how much deeper the recess must be made. The use of such gauges, however, is somewhat awkward in that it is difficult to maintain in a proper orientation with respect to the penetration axis while moving it around the periphery of the recess. Also, no indication of the recess diameter is provided with such a auge. Another possible method is to have a set of individual templates for the weld prep of each penetration. Such an arrangement results in an unwieldy number of templates. Since the material removed after the initial rough torch cut is generally ground away with a grinding wheel an unreasonable length of grinding time was necessary to accurately machine each recess.

BRIEF SUMMARY OF THE INVENTION

The present invention is directed to a manually manipulatable template for use in accurately estimating the amount of material which must be removed from the weld prep area surrounding a penetration made in a hemispherical head. With this information available, a cutting torch may be used to remove a greater amount of the unwanted metal, thus reducing grinding time. Regardless of the loaction of the weld prep on the head surface the template maintains a constant depth and diameter with reference to the longitudinal axis of the penetration.

A parallel linkage arrangement, comprising an inverted L-shaped member and an elongated slotted member, is pinned for pivotal motion to a mounting plate one edge of which has a radius of curvature matching that of the internal surface of the head. The end of one leg of the L-shaped member and one end of the slotted member bear the desired recess profile and extend beyond the curved edge of the mounting plate a distance equal to the weld prep depth. The L-shaped member and the slotted member are attached to one another and in turn slidably attached to the mounting plate, through a pair of arcuate slots, in such a manner that, when pivoted, a parallel relationship and a constant distance is maintained between the two outside edges of the profile bearing ends, this distance being equal to the desired recess diameter. The sliding connection through the arcuate slots serves as a support to the upper part of, and promotes smooth operation of, the parallel linkage.

BRIEF DESCRIPTION OF THE DRAWINGS

FIG. 3 is an elevation view of the weld prep template.

FIG. 4 is a sectional view taken along the lines 4—4 of FIG. 3.

FIG. 5 is a plan view of the template.

DESCRIPTION OF THE PREFERRED EMBODIMENT

Figure 2:
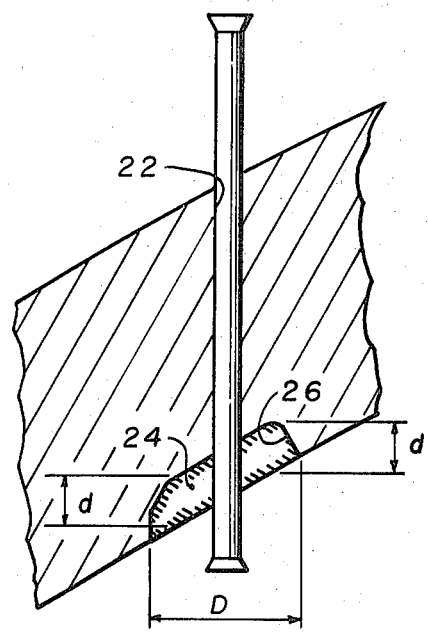
FIG. 2 is an enlarged view of one of the nozzle attachments shown in FIG. 1.
Figure 1:
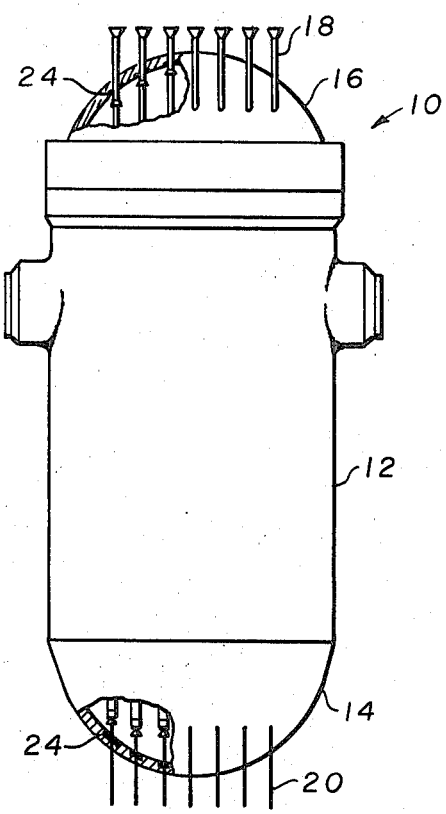
FIG. 1 is an elevation view, partly broken away, illustrating a nuclear reactor having spherical heads through which penetrations have been made to receive control rod and instrumentation nozzles. The seal weld material attaching the nozzles to the interior surface of the reactor head is received in weld prep recesses of the type which the present invention is useful in accurately machining.

Referring first to FIG. 1, there is illustrated a nuclear reactor 10 which includes a reactor vessel 12 having an integrally formed hemispherical bottom head 14 and a detachable hemispherical closure head 16. Extending from the closure head 16 are a plurality of nozzles 18 to which are mounted control element drive assemblies (not shown). Similarly, instrumentation nozzles 20 extend from the bottom head 14. Each of the nozzles 18, 20 extends through a suitable penetration 22 in the head and is attached to the interior surface of the head, as shown in FIG. 2, by means of a seal weld 24 placed in a weld prep recess 26.

Referring, again, to FIG. 2, the letter "D" is used to identify the dimension referred to hereinafter as the weld prep diameter. This diameter is equal to the diameter of the apparent circle which the weld prep would appear to be if it were viewed from the lower side of the spherical head along the longitudinal axis of the head penetration 22. The letter "$d$" is used to identify the depth dimension of the weld prep recess. As shown in the drawing this dimension is measured parallel to the longitudinal axis of the head opening 22, and remains constant throughout substantially all of the weld prep recess. The only exception being at the outer periphery of the recess where, as per standard welding practice, the depth of the recess gradually transitions to the spherical surface as shown in the drawing to the right and to the left of where the diemension "$d$" has been indicated.

Referring now to FIG. 3, the template 28 comprises a generally rectangular mounting plate 30, one edge 32 of which is cut to match the radius of curvature of the hemispherical surface on which it is to be used. Midway along this edge 32 of the mounting plate is a tab-like extension 34. This extension is shorter in length than the diameter "D" of the weld prep recess and extends out from the radius bearing edge 32 a distance less than the weld prep depth "$d$". The plate 30 contains a circular opening 36 (FIG. 4) and a slotted opening 38, the center and longitudinal axis, respectively, of which lie along the radius edge 32 as extended across the tab extension 34. The mounting plate 30 also includes a pair of spaced apart arcuate slots 40, the defining radii of which originate from the center of the circular opening 36, and which lie substantially to the right of the left-hand end of the slot 38.

An L-shaped member 42 is mounted to the plate 30, in an inverted position, with its longer leg 44 overlying the circular opening 36. The end 46 of the longer leg 44 bears the desired recess profile and extends beyond the radius bearing edge 32, as extended to the center of the opening 36, a distance equal to the desired recess depth "$d$". The shorter leg 48 of the inverted L-shaped member 42 is sized so that, when the longer leg 44 is in an upright position, the end of the shorter leg 48 overlies the left-hand end of each of the arcuate slots 40.

The mounting of the L-shaped member 42 to the plate 30 is accomplished by means of a pin assembly 50 extending through the circular opening 36 in the plate end through a similar opening 52 in the longer leg 44. Referring to FIG. 4 this assembly comprises a pin 54 and washers 56 which are tack welded as at 58 to the pin ends following assembly. Sufficient clearance is allowed between the interconnected members and the pin to permit free pivotal motion about the pinned connection.

An elongated member 60, having a slotted opening 62 over a substantial portion of its length, is pinned to the short slot 38 in the mounting plate 30 by means of a pin assembly 64, similar to that described above in connection with the L-shaped member. This connection permits pivotal motion of the elongated member about the axis of the pin, as well as a horizontal sliding motion of the member and the pin in the slot 38. One end 66 of this member extends below the pinned connection 64 a distance equal to "$d$" and bears the desired recess profile as did the end of the longer leg of the L-shaped member. The distance from the left-hand edge 68 of the L-shaped member 42, to the right-hand edge 70 of the elongated member 60 is equal to the desired weld prep recess diameter "D" when the two mentioned edges are parallel and the pinned connection 64 abuts the left-hand end of the slot 38.

The elongated member 60 is connected, in the orientation described above, to the end of the shorter leg 48 and to the mounting plate 30, through the arcuate slots 40 by means of two pin assemblies 72, similar to those previously described. As best shown in FIGS. 3-5 these connections are made with the elongated member 60 sandwiched between the mounting plate 30 and the L-shaped member 42. A "Z"-shaped jog 74 is formed in the shorter leg 48 of the L-shaped member 42 to facilitate freedom of movement of the assembled template.

When assembled as described above the outer edges of the profile bearing legs 46, 66 define the desired interior countour of the weld prep with respect to the radius bearing edge 32. As the inverted L-shaped member 42 is rotated about the pinned connection 50, the two pinned connections 72 on the shorter leg 48 of the member pass through the arcuate slots 40 in the mounting plate 30. The elongated member 60 also rotates with the L-shaped member 42, the two pinned connections 72 sliding through the large slot 62 in the elongated member 60, while also serving to maintain a parallel relationship between the outside edges 68, 70 of the two members. As this rotation occurs the pinned connection 64 between the mounting plate 30 and the elongated member 60 moves to the right in the slot 38. As a result, not only is the parallel relationship between the profile defining members maintained, but the dimension "D" is maintained constant as the members rotate.

In use the template 28 is positioned over a weld prep recess which has been roughed out with a cutting torch. The mounting plate 30 is held perpendicular to the spherical surface and the parallel linkage assembly is rotated until the longer leg 44 of the L-shaped member 42 and, as a result, the elongated member 60, are parallel to the longitudinal axis of the penetration. The profile bearing ends 46, 66 are inserted into the recess 26 and the mounting plate 30 is rotated about the axis of the pilot hole. As this rotation occurs the parallel linkage must be pivotted on the mounting plate in order to maintain the desired parallel relation to the penetration axis. As the template 28 is rotated the user notes whether the radius bearing edge 32 of the template 28 is in contact with the spherical surface. Where a space exists between the edge 32 and the spherical surface it is an indication that the recess 26 is not sufficiently deep at the point being measured and that additional material must be removed, either by torch or grinding. If the diameter of the recess is too small, the profile bearing ends 46, 66 will not fit into the recess and the user knows that additional material must be removed from the periphery of tee recess.

Figure 6:
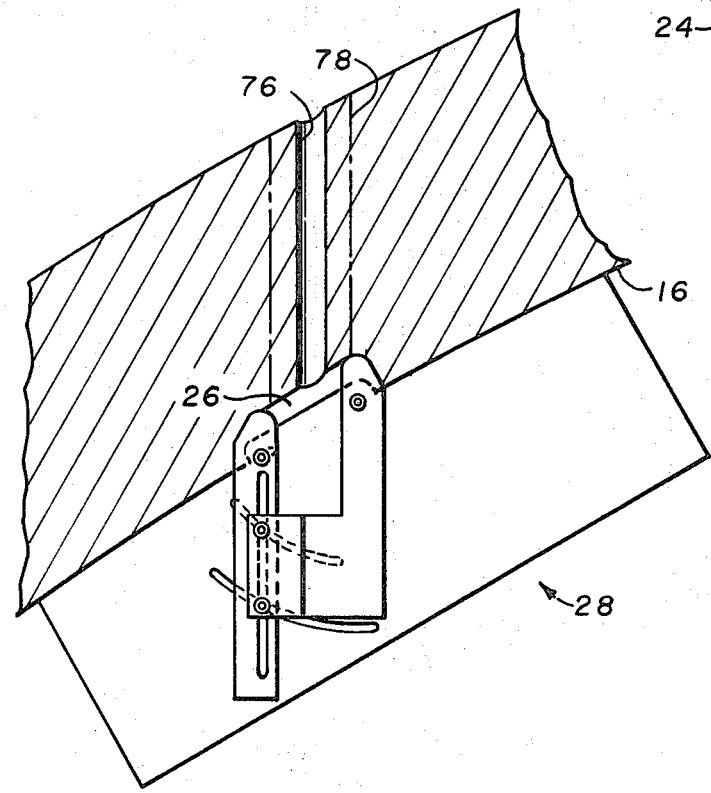
FIG. 6 is a partial sectional view of a weld prep made in the interior surface of an upper closure head and showing the template in working engagement therewith.

FIG. 6 shows a template 28 in proper working engagement with a completed weld prep recess 26 in a hemispherical closure head 16. The penetration pilot hole 76 and a phantom outline of the final penetration opening 78 are also shown in this view.

While a preferred embodiment of the invention has been shown and described, it is to be understood that such showing is merely illustrative and that changes may be made without departing from the spirit and scope of the invention as claimed.

What is claimed is:

1. A template for use in estimating the amount of material which must be removed to machine, in a spherical surface, a recess having a desired interior contour, said contour being defined by a desired recess depth and a desired recess diameter comprising:

a mounting plate, one edge of said plate having a radius of curvature conforming to that of the spherical surface;

an inverted L-shaped member having a first leg and a second leg, the end of said first leg being shaped to conform to the desired recess interior contour;

means for connecting said inverted L-shaped member to said mounting plate for pivotal motion of said inverted member about a point lying on said one edge of said plate and with said end of said first leg extending beyond said one edge of said plate a distance equal to the desired recess depth;

an elongated member having a slotted opening extending longitudinally thereof over a substantial part of its length, one end of said elongated member being shaped to conform to the desired recess interior contour;

means for mounting said elongated member to said mounting plate with said shaped end of said elongated member extending beyond said one edge of said plate a distance equal to the desired recess depth, and with the outer edge of said end of said first leg spaced from the outer edge of said shaped end of said elongated member a distance equal to the desired recess diameter said mounting means permitting limited horizontal motion of said elongated member along a path substantially coincident with said one edge of said plate, and pivotal motion of said elongated member about any point lying on said path; and means for interconnecting said inverted L-shaped member with said elongated slotted member in such an orientation that said first leg of said L-shaped member is parallel to said elongated slotted member, said means comprising two vertically spaced pinned connections extending through said second leg and slidably engaging said slotted opening in said elongated member, whereby the parallel relationship between said first leg and said elongated member is maintained as the members are pivotally moved.

2. The apparatus of claim 1 wherein each of said pinned connections is slidably engaged with an arcuate slot in said mounting plate, the location of the slot associated with each pinned connection being defined by the arc described by said connection as the L-shaped member is pivotted.

* * * * *